United States Patent [19]

Zolda

[11] Patent Number: 5,287,032
[45] Date of Patent: Feb. 15, 1994

[54] ELECTRIC MOTOR WITH TUBULAR HOUSING

[75] Inventor: Ernst Zolda, Korntal-Muenchingen, Fed. Rep. of Germany

[73] Assignee: Robert Bosch GmbH, Stuttgart, Fed. Rep. of Germany

[21] Appl. No.: 845,276

[22] Filed: Mar. 3, 1992

[30] Foreign Application Priority Data

Apr. 5, 1991 [DE] Fed. Rep. of Germany ....... 4110971

[51] Int. Cl.$^5$ .................................................. H02K 13/00
[52] U.S. Cl. ............................................ 310/219; 310/89;
310/190; 310/209; 310/233; 310/239; 310/248;
417/366
[58] Field of Search ............... 310/154, 190, 219, 209,
310/232, 195, 233, 261, 237, 89, 248, 239;
417/366

[56] References Cited

U.S. PATENT DOCUMENTS

| | | | |
|---|---|---|---|
| 1,565,252 | 12/1925 | Brisbois | 310/209 UX |
| 3,244,917 | 4/1966 | Gute | 310/237 |
| 3,609,428 | 9/1971 | Cotton | 310/237 |
| 4,099,077 | 7/1978 | Maekawa | 310/237 |
| 4,119,875 | 10/1978 | Noguchi | 310/237 |
| 4,488,073 | 12/1984 | Morishita | 310/154 |
| 4,533,848 | 8/1985 | Nakamura | 310/237 |
| 4,827,173 | 2/1989 | Corbach | 310/154 |
| 4,971,530 | 11/1990 | Nusser | 417/366 |
| 5,045,741 | 9/1991 | Dvorsky | 310/209 |
| 5,049,771 | 9/1991 | Challita | 310/219 |

FOREIGN PATENT DOCUMENTS

| | | | |
|---|---|---|---|
| 1074323 | 1/1960 | Fed. Rep. of Germany | 310/209 |
| 3016086 | 11/1980 | Fed. Rep. of Germany | . |
| 1578787 | 7/1990 | U.S.S.R. | 310/219 |
| 2047980 | 4/1980 | United Kingdom | . |

*Primary Examiner*—R. Skudy
*Attorney, Agent, or Firm*—Michael J. Striker

[57] ABSTRACT

An electric motor has a tubular housing part, permanent magnets arranged inside the housing part, a rotatable motor armature with a collector having a running surface, a plurality of sliding brushes having sliding surfaces abutting against the running surface of the collector, and an element for loading the motor armature in direction of its rotary axis toward the sliding brushes so that the running surface of the collector which in its projection is formed as an annular surface abuts against the sliding surfaces of the sliding brushes.

11 Claims, 2 Drawing Sheets

ELECTRIC MOTOR WITH TUBULAR HOUSING

BACKGROUND OF THE INVENTION

The present invention relates generally to an electric motor.

More particularly it relates to an electric motor which has a tubular housing with permanent magnets of a motor arranged on its inner wall and with a rotatable motor armature having a collector cooperating with sliding brushes.

Electric motors of the above mentioned general type are known in the art. In a known electric motor the sliding brushes are guided in a guiding case and abut against a running surface of a so-called drum collector under the action of pressing springs. For such a construction certain mounting and manufacturing expenses are required.

SUMMARY OF THE INVENTION

Accordingly, it is an object of the present invention to provide an electric motor of the above mentioned general type, which avoids the disadvantages of the prior art.

In keeping with these objects and with others which will become apparent hereinafter, one feature of the present invention resides, briefly stated, in an electric motor of the above mentioned type in which the sliding brush is fixed on the housing, and means is provided which load the motor armature in direction of the armature rotary axis toward the sliding brushes so that the collector running surface which is seen in its projection as an annular surface abuts against the sliding surfaces of the sliding brush.

When the electric motor is designed in accordance with the present invention both the guiding case and the pressing springs can be dispensed with.

The mounting of the commutating device of the electric motor is limited to the arrangement of the sliding brush on a corresponding housing part, since after insertion of the motor armature in the housing the means are provided for the required contact between the collector and the sliding brush. For this purpose the collector sliding surface, as seen in the direction of the armature rotary axis, must have an annular projection surface.

It is especially advantageous when the inventive electric motor is used as a drive motor in an aggregate for feeding of fuel from a feed tank to an internal combustion engine of a motor vehicle. Such aggregate includes a feed pump which advances the fuel through the aggregate housing so that the motor armature of the drive motor rotates in full.

For using such a feed aggregate also for feeding fuels acting as electrolytes, in the main feed aggregate disclosed in the German reference DE-OS 3,016,086 the individual wires of a copper cord which leads from an electrical terminal to a carbon brush arranged in a box-shaped or a case-shaped guide is surrounded by a protective casing of nickel, zinc, silver or aluminum. This is because with the alcohol fuels under consideration which for example contain 15% methanol (M15) the electrical conductivity lies in micro-Siemens-region ($\mu$-Siemens). This leads to the fact that methanol binds water. With pure methanol (M100) or ethanol (E100) fuels, its conductivity increases due to the oxidation yield and the resulting formation of formic acid in M100 or acetic acid in E100. With electrical conductivities in the micro-Siemens-region this liquid acts as electrolyte sputtering, especially over anode-side located, current conductive, clean conductors occurs, due to the potential difference in the motor. With the conventional fuels whose conductivity lies in Piko-Siemens-region (pS), these considerations play no role.

The measures for preventing the above described electro erosion which are utilized in the above mentioned prior art, rigidify however the brush strength so much that with the conventional brush pressing springs formed as helical pressing springs the orderly abutment of the brush against the contact surface of the commutator is no longer guaranteed. A corresponding rigidification of the pressing springs increases however the wear of the carbon brush and reduces the efficiency of the electrical drive motor and therefore of the feeding aggregate. Further details of these problems are disclosed in the German reference DE-OS 3,016,086.

All the above described problems are eliminated when the electrical drive motor is designed in accordance with the present invention. Both the brush cable and the pressing springs for the sliding brush are eliminated. As a result the brushes themselves can be made relatively short.

In accordance with another feature of the present invention the means for loading the motor armature in direction of the armature rotary axis to the sliding brush is formed by a magnetic force which acts on the motor armature and is produced by the permanent magnet.

In accordance with another feature of the present invention, the distance between the magnet center and the sliding brush in direction of the rotary axis of the motor armature is smaller than the distance from the set center and the sliding brush.

The running surface of the collector can be formed as a conical surface, and the sliding surfaces of the sliding brush can correspond to the course of the running surface of the collector. On the other hand, the running surface of the collector can be disc-shaped, and the sliding surface of the sliding brush can correspond to the course of the disc-shaped sliding surface.

In accordance with yet another feature of the present invention the sliding brushes are mounted on a structural element which is a part of the housing. On the other hand, the sliding brushes can be mounted on the inner wall of a housing cover which is arranged on the tubular housing part.

Still another feature of the present invention is that isolation is arranged between the sliding brushes and the inner wall of the housing cover.

An electrical conductor connected with the sliding brush can extend through the housing, for example through the housing cover. The running surface of the collector can be composed of carbon.

In accordance with still a further feature of the present invention, the tubular housing part covers not only the electric motor but also a feed pump which is driven by it, and the thusly formed feed aggregate supplies fuel from a feed tank to an internal combustion engine of a motor vehicle so that fuel flows through the feed aggregate.

Finally, the motor armature can be operatively connected with a feed member of a feed pump and displaceable longitudinally relative to it.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 5:
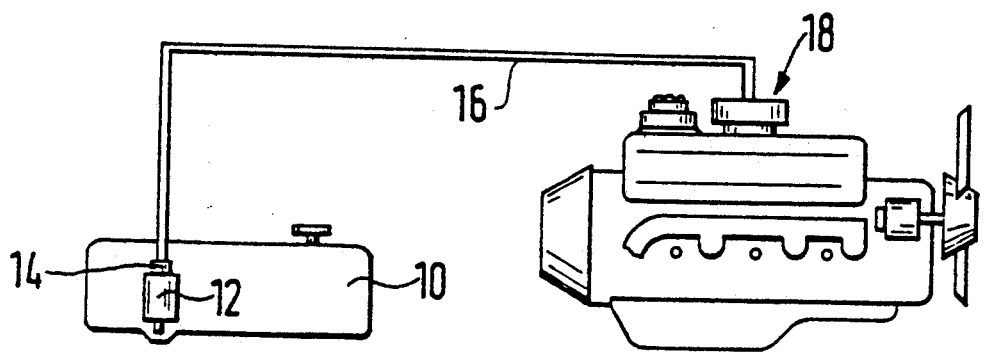
FIG. 5 is a schematic view showing a device for feeding fuel from a supply tank to an internal combustion engine of a motor vehicle.

A fuel feeding device shown in FIG. 5 has a feed aggregate 12 which is arranged in a supply tank 10 and provided with a pressure pipe 14 with a pressure conduit 16. The pressure conduit 16 leads from the supply tank to an internal combustion engine 18 of a not shown motor vehicle. In this embodiment the feed aggregate 12 is formed as a so-called in-tank-aggregate. It is however also recommended to arrange the aggregate outside the supply tank and provided with a suction conduit which opens in a bottom region of the supply tank 10.

Figure 1:
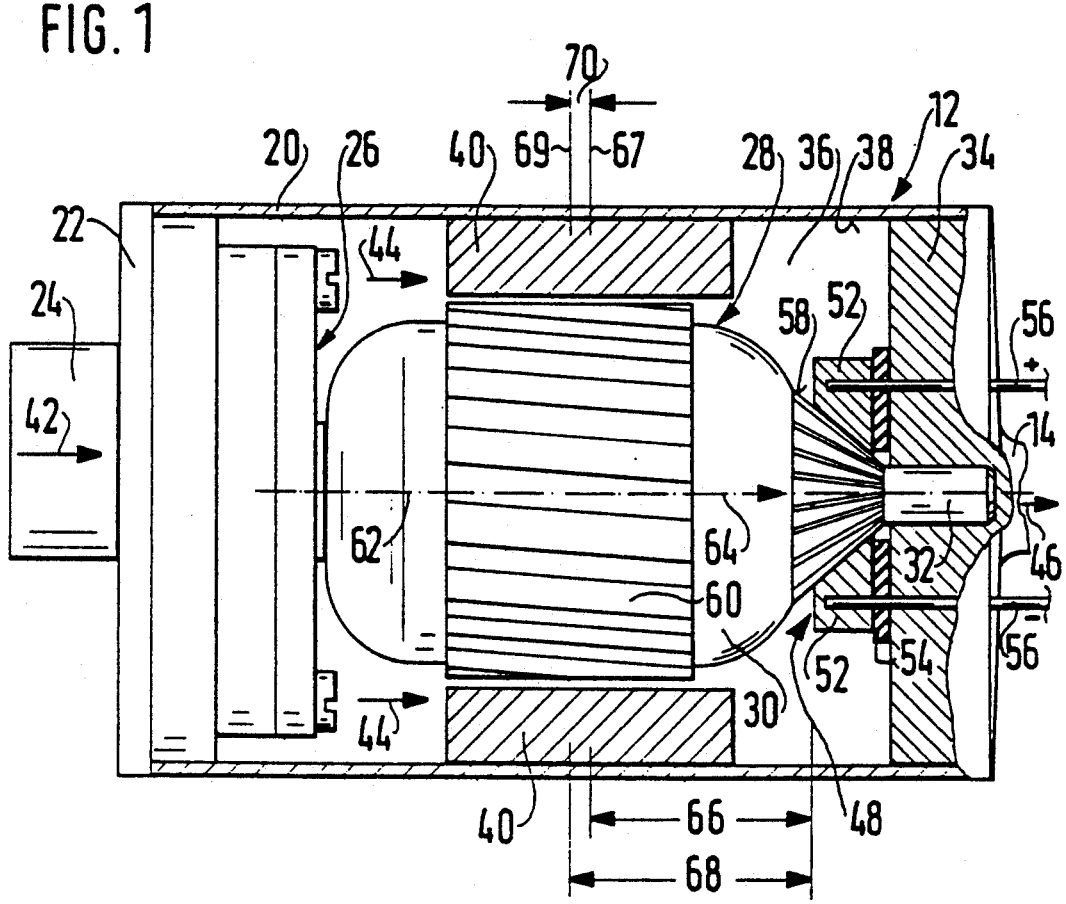
FIG. 1 is a view showing an electric motor for driving a feed pump which is arranged in a common housing.
Figure 2:
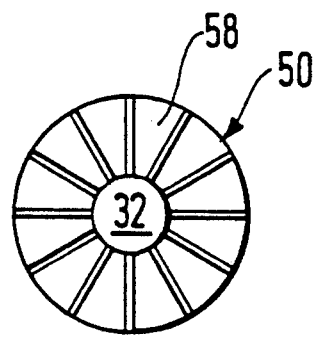
FIG. 2 is a view showing a motor armature of a drive motor with a running surface of an associated, conical collector as seen in direction of the rotary axis.

FIG. 1 shows the fuel feed aggregate 12 surrounded by a housing. The housing has a tubular housing part 20 with an opening which is covered with a so-called suction cover 22. The suction cover 22 is provided with a suction pipe 24. A fuel feed pump 26 is arranged on the inner side of the suction cover 22. It can be formed as a flow pump or a displacement pump. A not shown feed member of the pump 26 is driven by an electric drive motor 28.

The drive motor 28 has a rotatably supported motor armature 30 with an armature shaft 32 coupled to the feed member of the pump 26. The armature shaft 32 is supported in another housing cover 34 which closes another opening of the tubular housing part 20. The housing cover 34 is a pressure-side cover. It has a pressure pipe 14 connected with a pressure conduit 16. The pressure-side cover 34 of the housing has not shown passages which communicate a chamber 36 in the housing with the pressure pipe 14. Finally, permanent magnets 40 are arranged on an inner wall 38 of the tubular housing part 20 and form parts of the electric drive motor 28. In the shown example the tubular housing part 20 also operates as a closing pipe for the electric drive motor.

When the electric drive motor 28 is activated, the pump 26 aspirates fuel from the supply tank 10 in direction of the arrow 42 and pump it in direction of the arrow 44 to the chamber 36. From the chamber 36 the fuel is supplied through the pressure pipe 14 into the pressure conduit 16 and then supplied in direction of the arrow 46. As shown in FIG. 1 the electric drive motor 28 is provided with a commutating device 48. The commutating device has a conical collector 50 and sliding brushes 52 mounted in the inner wall of the pressure-side cover 34. An insulating ring 54 is located between the cover 34 and the sliding brushes 52. The electrical conductors 56 are anchored in the sliding brushes 52 and extend through the isolating element 54 and the cover 34 in a fluid-tight manner.

The sliding surfaces of the carbon brushes 52 correspond to the conical surfaces 58 of the conical collector 50. In order to provide an orderly abutment between the sliding surfaces of the sliding brushes and the conical surface 58 of the collector 50, a sheet pack 60 which supports the armature windings is offset in direction of the rotary axis 62 of the armature with respect to the magnets 40 so that an armature pull in direction of the arrow 64 is produced.

As can be seen from FIG. 1, a distance 66 between the center 67 of the magnets and sliding brushes 52 is smaller than the distance 68 between the center 69 of the sheet pack 60 and the sliding brushes 52. The difference is identified in FIG. 1 with reference numeral 70. This magnetic force which acts in direction of the arrow 64 forms a means which load the motor armature 30 in direction of the armature rotary axis 62 toward the sliding brushes 52. Therefore the collector running surface 58 which in the projection is an annular surface, orderly abuts against the sliding surfaces of the sliding brushes 52.

Figure 3:
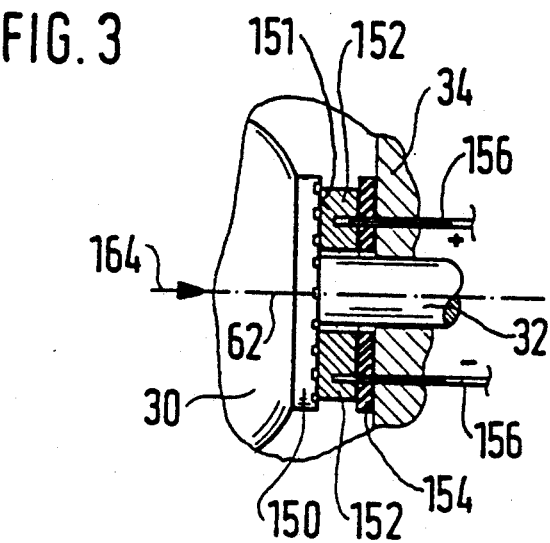
FIG. 3 is a partial view of the electric motor of FIG. 1 formed in accordance with another embodiment with a so-called plan collector.
Figure 4:
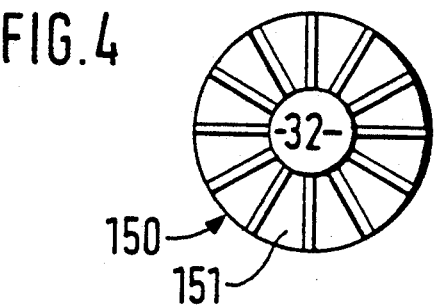
FIG. 4 is a view substantially corresponding to the view of FIG. 2 and showing the running surface of the plan collector.

Instead of a conical commutator it is also possible to arrange on the motor armature a so-called plan collector. Such an arrangement is shown in FIGS. 3 and 4. FIG. 3 shows a part of the motor armature 30 with the armature shaft 32 and a pressure-side cover 34. It can be further seen that the motor armature 30 has a so-called plan or disc collector 150. Sliding brushes 152 with their sliding surfaces abut against the sliding or end surface 151 of the collector 150, The sliding brushes are fixed on the pressure-side cover 34 of the feed aggregate. An insulating ring 154 is arranged between the cover 34 and the sliding brushes 152. Further, electrical conductors 156 also extend through the pressure-side cover 34 and are anchored in the sliding brushes 152.

In this embodiment the arrangement of the magnets 40 with respect to the sheet pack 60 of the motor armature 30 is selected so that a force is produced which is identified with the arrow 164 and provides abutment of the running surface 151 of the collector 150 against the associated sliding surfaces of the sliding brushes 152. In this case the collector running surface 151 is an annular surface when seen in direction of the armature rotary axis 62, and the sliding surfaces of the sliding brushes abut against the annular surface. The pushing or pulling forces identified with the arrows 64 and 164 also are produced by the permanent magnets 40 of the electric motor.

For compensating the relatively low wear of the sliding brushes during the operation of the feed aggregate 12, the motor armature is longitudinally displaceable within certain limits in direction of the rotary axis 64. This displaceability has, however, no influence on the rotary take-off of the feed member of the pump 26 since a not shown coupling is arranged between them and insures the required rotary take-off. From the above mentioned reasons of electroerosion it is advantageous when at least the running surface of the collector 50 or 150 is produced for example of synthetic carbon.

It will be understood that each of the elements described above, or two or more together, may also find a useful application in other types of constructions differing from the types described above.

While the invention has been illustrated and described as embodied in an electric motor with a tubular housing part, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electric motor, comprising a housing having tubular housing part; permanent magnets arranged inside said housing part; a motor armature rotatable about an axis and provided with a collector having a conical running surface; a plurality of sliding brushes fixed on said housing and having sliding surfaces abutting against said conical running surface of said collector; and means for permanently loading said motor armature in direction of its rotary axis toward said fixed sliding brushes so that said conical running surface of said collector which in its projection is formed as an annular surface abuts against said sliding surfaces of said sliding brushes.

2. An electric motor as defined in claim 1, wherein said permanent magnets produce a magnetic force which acts on said motor armature as said means for loading said motor armature.

3. An electric motor as defined in claim 2, wherein said motor armature has a sheet pack, a distance between a center of said magnets and said sliding brushes as considered in direction of said armature rotary axis being smaller than a distance between a center of said sheet pack and said sliding brushes.

4. An electric motor as defined in claim 1, wherein said housing has a structural part, said sliding brushes being mounted on said structural part of said housing.

5. An electric motor as defined in claim 4, wherein said housing has a tubular housing part and a housing cover which closes said housing part and forms said structural part, said housing cover having an inner wall on which sliding brushes are mounted.

6. An electric motor as defined in claim 5; and further comprising an insulating element which is arranged between said sliding brushes and said inner wall of said housing cover.

7. An electric motor as defined in claim 1; and further comprising electrical conductors which are connected with said sliding brushes and extend through said housing.

8. An electric motor as defined in claim 5; and further comprising electrical conductors which are connected with said sliding brushes and extend through said housing cover.

9. An electric motor as defined in claim 1, wherein said running surface of said collector is composed of carbon.

10. A feed aggregate for feeding fuel from a supply tank to an internal combustion engine of a motor vehicle, comprising an electric motor having a housing with a tubular housing part, permanent magnets arranged inside said housing part, a rotatable motor armature with a collector having a conical running surface, a plurality of sliding brushes fixed on said housing and having sliding surfaces abutting against said conical running surface of said collector, and means for loading said motor armature in direction of its rotary axis toward said fixed sliding brushes so that said conical running surface of said collector which in its projection is formed as an annular surface abuts against said sliding surfaces of said sliding brushes; and a feed pump which is located in said tubular housing and driven by said electric motor so that fuel flows through said feed aggregate.

11. An aggregate as defined in claim 10, wherein said motor armature of said electric motor is operatively connected with said feed pump and longitudinally displaceable relative to said feed pump.

* * * * *